United States Patent
Kempe et al.

(10) Patent No.: US 12,195,030 B2
(45) Date of Patent: Jan. 14, 2025

(54) METHOD FOR OPERATING A VEHICLE IN AN AUTOMATED DRIVING OPERATION

(71) Applicant: MERCEDES-BENZ GROUP AG, Stuttgart (DE)

(72) Inventors: Steffen Kempe, Ulm (DE); Rihab Laarousi, Gärtringen (DE); Daniela Wolf, Sindelfingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/691,595

(22) PCT Filed: Jul. 21, 2022

(86) PCT No.: PCT/EP2022/070559
§ 371 (c)(1),
(2) Date: Mar. 13, 2024

(87) PCT Pub. No.: WO2023/041226
PCT Pub. Date: Mar. 23, 2023

(65) Prior Publication Data
US 2024/0262379 A1    Aug. 8, 2024

(30) Foreign Application Priority Data
Sep. 14, 2021   (DE) ..................... 10 2021 004 646.3

(51) Int. Cl.
*B60W 50/14*    (2020.01)
*B60W 60/00*    (2020.01)

(52) U.S. Cl.
CPC ...... *B60W 50/14* (2013.01); *B60W 60/00186* (2020.02); *B60W 60/0053* (2020.02);
(Continued)

(58) Field of Classification Search
CPC ........... B60W 50/14; B60W 60/00186; B60W 60/0053; B60W 60/0057;
(Continued)

(56) References Cited

U.S. PATENT DOCUMENTS 3,760,415 A * 9/1973 Holmstrom ........... G01S 13/931
                                                    342/72
4,931,767 A   6/1990 Albrecht et al.
(Continued)

FOREIGN PATENT DOCUMENTS

DE            3735267 C3    3/1996
DE           19934670 A1   12/2000
(Continued)

OTHER PUBLICATIONS

Office Action dated Jun. 28, 2024 in related/corresponding KR Application No. 10-2024-7005836.
(Continued)

*Primary Examiner* — Daryl C Pope
(74) *Attorney, Agent, or Firm* — PATENT PORTFOLIO BUILDERS PLLC (57) ABSTRACT

A respective range of environment recording sensors of the vehicle is estimated by evaluating sensor signals of the sensors to check whether the ranges of the sensors respectively is sufficient for automated driving operation. If only one of, or only a predetermined subset of, the sensors do not have a sufficient estimated range, the vehicle continues to be moved in automated driving operation maintaining a speed of the vehicle or reducing it to a predetermined limited extent. A request to take over a driving task is output instantly or after a pre-determined time delay. If all of the sensors or more or different sensors than the predetermined subset do not have a sufficient estimated range, the vehicle continues to be moved with the speed of the vehicle reduced (Continued)

to a predetermined more significant extent, and the request to take over the task of driving the vehicle is instantly output.

9 Claims, 4 Drawing Sheets

(52) U.S. Cl.
CPC ... *B60W 60/0057* (2020.02); *B60W 2420/403* (2013.01); *B60W 2420/408* (2024.01); *B60W 2556/20* (2020.02); *B60W 2556/25* (2020.02)

(58) Field of Classification Search
CPC ..... B60W 2420/403; B60W 2420/408; B60W 2556/20; B60W 2556/25; B60W 40/02; B60W 2720/10; G01S 7/40; G01S 7/497; G01S 13/865; G01S 13/867; G01S 17/931; G01S 13/931; G01S 2013/9323; G05D 1/221
See application file for complete search history.

(56) References Cited

U.S. PATENT DOCUMENTS

| | | | |
|---|---|---|---|
| 11,634,150 | B2 | 4/2023 | Ono et al. |
| 11,787,424 | B2 | 10/2023 | Keller et al. |
| 2012/0101704 | A1 | 4/2012 | Wagner |
| 2019/0004513 | A1 | 1/2019 | Chiba et al. |
| 2020/0339151 | A1 | 10/2020 | Batts et al. |
| 2023/0373530 | A1* | 11/2023 | Kume ............... G08G 1/16 |

FOREIGN PATENT DOCUMENTS

| | | |
|---|---|---|
| DE | 102010049091 A1 | 4/2012 |
| DE | 102014212216 A1 | 12/2015 |
| DE | 102017003741 A1 | 10/2018 |
| DE | 102018003784 A1 | 11/2018 |
| DE | 102018127059 A1 | 4/2020 |
| DE | 102019130037 A1 | 5/2021 |
| JP | 2020064402 A | 4/2020 |
| WO | 2017022417 A1 | 2/2017 |
| WO | 2020088857 A1 | 5/2020 |

OTHER PUBLICATIONS

Office Action dated Aug. 6, 2024 in related/corresponding JP Application No. 2024-516354.

International Search Report and Written Opinion mailed Nov. 11, 2022 in related/corresponding International Application No. PCT/EP2022/070559.

Office Action created May 20, 2022 in related/corresponding DE Application No. 10 2021 004 646.3.

* cited by examiner

METHOD FOR OPERATING A VEHICLE IN AN AUTOMATED DRIVING OPERATION

BACKGROUND AND SUMMARY OF THE INVENTION

Exemplary embodiments of the invention relate to a method for operating a vehicle in an automated driving operation.

DE 199 34 670 A1 discloses an object detection system for a motor vehicle consisting of a combination of at least three object detectors, which respectively have a different detection region and/or a different detection range.

DE 37 35 267 C3 discloses a device for measuring visual range. It comprises light emitters for generating light pulses or light flashes, a light sensor for registering light scattered back from scatter zones in the light path when light pulses or light flashes are emitted, and a circuit for evaluating the output signals of the light sensor. The backscattering caused by scatter zones outside of the windscreen of a driver cabin or operator cabin of a motor vehicle can be evaluated. In addition, the backscattering caused by dirt on the windscreen can be evaluated. For this purpose, the light emitter and the light sensor are arranged on the inside of the windscreen, and the light pulses or light flashes are directed onto the windscreen, and outwards through the latter. Several light emitters for light of different wavelengths are arranged, in order to evaluate a scatter behavior dependent on the size of the light-scattering particles of the scatter zones, in order to differentiate different kinds of viewing impairment.

Exemplary embodiments of the invention are directed to a new method for operating a vehicle in an automated driving operation.

In a method for operating a vehicle in an automated, in particular in a highly automated or autonomous driving operation, a respective range of environment recording sensors of the vehicle is estimated according to the invention by evaluating sensor signals of the environment recording sensors. This relates, in particular, exclusively to those environment recording sensors of the vehicle that are provided to record an environment of the vehicle in the direction of travel of the vehicle, in particular an environment straight and obliquely in front of the vehicle, in particular relating to a lane of the vehicle and at least one lane adjacent thereto, or respectively at least one lane adjacent thereto on both sides, because in particular these environment recording sensors are required to carry out the automated, in particular highly automated or autonomous driving operation.

Using the estimated ranges, it is then checked whether the environment recording sensors respectively have a sufficient range for the automated, in particular highly automated or autonomous driving operation, i.e., whether the respective estimated range is sufficient. The respective range, i.e., the estimated range of the respective environment recording sensor is in particular viewed, i.e., assessed, as being sufficient if the vehicle can be braked to a standstill within this range with a predetermined delay, and/or if the respective range, i.e., the respective range of the respective environment recording sensor, exceeds a minimum sensor range predetermined for the current speed of the vehicle.

The speed that is predetermined for carrying out the automated, in particular highly automated or autonomous driving operation normally when the vehicle is on a clear road, i.e., for example a speed predetermined by the vehicle driver or a maximum speed predetermined for the automated, in particular highly automated or autonomous driving operation, is for example used as a current speed of the vehicle or as a speed used to determine whether the vehicle can be braked to a standstill within the estimated range with the predetermined delay. In this embodiment, the current speed of the vehicle is thus, in particular, an in particular current predetermined intended speed. As an alternative, it is, for example, provided that the speed currently actually being driven at, i.e., the speed with which the vehicle is currently actually driving, is, for example, used as the current speed of the vehicle or as the speed used to determine whether the vehicle can be braked to a standstill within the estimated range with the predetermined delay. When the road is clear, this current speed for example corresponds to the speed specified above, i.e., to the speed that is predetermined for carrying out the automated, in particular highly automated or autonomous driving operation normally when the vehicle is on a clear road, i.e., for example, the speed predetermined by the vehicle driver, or the maximum speed predetermined for the automated, in particular highly automated or autonomous driving operation. In traffic situations in which this is not possible, for example in a traffic jam and/or in dense traffic and/or when there is another, slower traffic participant in front of the vehicle, however, the current speed of the vehicle actually being driven at is lower. In this embodiment, in such a case, this lower speed of the vehicle currently actually being driven at is thus used as a current speed of the vehicle, i.e., as the speed used to determine whether the vehicle can be braked to a standstill within the estimated range with the predetermined delay.

If it is determined that only one of the environment recording sensors does not have a sufficient range, i.e., that its estimated range is not sufficient, or that only a predetermined subset of the environment recording sensors respectively do not have a sufficient range, i.e., that their respective estimated range is not sufficient, the vehicle is advantageously still moved in the automated, in particular highly automated or autonomous driving operation, wherein a speed of the vehicle is, for example, kept constant, or is reduced to a predetermined limited extent, for example by a predetermined relative value, in particular specified in percent, or by a predetermined absolute value, in particular specified in km/h, and wherein, for example, a request to take over a driving task is output to a vehicle driver instantly or after a predetermined time delay. It can, for example, be provided that only one relative or absolute value, by which the speed of the vehicle is reduced, is predetermined, or, for example, several relative values and/or several absolute values can be predetermined, which are used depending on the respectively estimated range. This means that the relative values and/or absolute values are then assigned to a respective range value or range of range values, and then the relative or absolute value is used which is assigned to the range value or range of range values of the respectively estimated range.

If it is determined that all of the environment recording sensors, or more environment recording sensors than the predetermined subset, or different environment recording sensors to the predetermined subset respectively do not have a sufficient range, i.e., that their respective estimated range is not sufficient, the vehicle is advantageously still moved in the automated, in particular highly automated or autonomous driving operation, wherein the speed of the vehicle is for example reduced to a predetermined more significant extent, i.e., more significantly than the predetermined low reduction specified above, and wherein, for example, the request to take over the task of driving the vehicle is output to the vehicle driver instantly. The automated, in particular highly automated or autonomous driving operation is otherwise advantageously continued, in particular without restriction, in particular if all of the environment recording sensors respectively have the sufficient range, i.e., if their respective estimated range is sufficient.

The method according to the invention thus makes it possible to control the automated, in particular highly automated or autonomous vehicle depending on the range of its environment recording sensors. If it is determined that there is a situation in which not all of the environment recording sensors have the sufficient range, one of the following options for action is advantageously selected, as described above:

Option A: Driving on at a constant or only slightly reduced speed, and outputting the takeover request to the vehicle driver instantly or with a time delay.

Option B: Driving on with a more significant reduction in speed, and instantly outputting the takeover request.

If only one of the environment recording sensors, or only a predetermined subset of the environment recording sensors does not or do not have a sufficient range, option A is advantageously selected. Otherwise, i.e., if all of the environment recording sensors or more or different environment recording sensors than the predetermined subset do not have a sufficient range, option B is advantageously selected.

Due to the solution according to the invention, the safety automated, in particular highly automated or autonomous driving operation of the vehicle is ensured, in that it is only permitted if the environment recording sensors fulfil predetermined requirements with regard to their range.

The automated, in particular highly automated or autonomous driving operation is advantageously ended if, after the request to take over the task of driving the vehicle has been output to the vehicle driver in the manner described above, the vehicle driver does not take over the driving task within a predetermined or pre-determinable takeover time interval following this output of the request. For example, the vehicle is then guided to a safe position and braked to a standstill, in order to avoid endangering vehicle occupants of the vehicle and other traffic participants. For example, it can also be provided that the vehicle is braked to a standstill within the lane it is driving in, i.e., it is not guided to another position.

The problem on which the described solution is based is, in particular, that the automated, in particular highly automated or autonomous driving operation is designed for speeds below a predetermined maximum speed. The speed of the vehicle must be adapted to the range of the environment recording sensors, such that the vehicle can react appropriately, in particular with a predetermined delay, to any hindrances which suddenly arise in a recording region of the environment recording sensors. Here it is problematic that the ranges of the environment recording sensors can be reduced due to dirt, functional disturbances, for example overheating, and/or weather conditions, for example fog and/or rain, to such an extent that a safe automated, in particular highly automated or autonomous driving operation can no longer be ensured at the current speed. The solution described shows which measures should be taken in such a case.

In particular, the respective range of environment recording sensors of different types is estimated in the manner described above, i.e., environment recording sensors of different types are, in particular, used for environment recording, for example at least one radar sensor, at least one lidar sensor and at least one camera sensor. Due to these different sensor technologies, their respective advantages can be used, and in particular their respective disadvantages can be compensated for.

In a lidar sensor or radar sensor, the estimation of the range is, for example, based on an evaluation of intensities of ground reflections and/or object reflections and a spacing from the place of reflection. In a camera sensor, the estimation of the range is, for example, based on a determination of a spacing from the furthest object which can still be recorded. The range can also be estimated by tracking the spacing from an object that is moving away from the vehicle. The estimated range of an environment recording sensor then corresponds to the spacing at which the tracked object is no longer recognized by the environment recording sensor.

For example, it is checked whether all of the environment recording sensors respectively have a sufficient range for the automated, in particular highly automated or autonomous driving operation by cyclically selecting the smallest range from the ranges respectively estimated for the environment recording sensors, and checking whether this smallest estimated range is sufficient for the automated, in particular highly automated or autonomous driving operation. Thus, this check advantageously does not need to be carried out for all of the environment recording sensors, but rather only for the environment recording sensor having the smallest estimated range.

In a possible embodiment, it is provided that the automated, in particular highly automated or autonomous driving operation is continued at the original speed, and no request to take over the driving task is output to the vehicle driver if, within the predetermined time delay until the request to take over the driving task is output to the vehicle user, it is determined that the environment recording sensors respectively have a sufficient estimated range for the automated, in particular highly automated or autonomous driving operation. In this case, the original speed is in particular the speed driven at by the vehicle before the speed is reduced, i.e., the speed used to determine whether the vehicle can be braked to a standstill within the estimated range with the predetermined delay before this reduction in speed. As described above, this can, for example, be the intended speed predetermined for the automated, in particular highly automated or autonomous driving operation, for example the speed predetermined by the vehicle driver or the maximum speed predetermined for the automated, in particular highly automated or autonomous driving operation, or, as described above, the currently lower speed due in particular to a respective traffic situation. Unnecessary takeover requests due to an estimated range that is only briefly insufficient and that does not represent a danger for occupants of the vehicle and other traffic participants, are thus avoided. The original speed of the vehicle is used as a current speed of the vehicle or as a speed used to determine whether the vehicle can be braked to a standstill within the estimated range with the predetermined delay, which original speed of the vehicle is maintained, or to which original speed the vehicle should be accelerated again when the automated, in particular highly automated or autonomous driving operation is continued, i.e., in particular the predetermined intended speed, for example the speed predetermined by the vehicle driver, or the maximum speed predetermined for the automated, in particular highly automated or autonomous driving operation, or, as described above, the lower speed due, for example, to a present traffic situation, but not the meanwhile potentially present reduced speed of the vehicle.

In a possible embodiment, the respective estimated range is first plausibility tested, and using the respective plausibility-tested estimated range, the further method steps described above are then carried out, i.e., in particular, it is checked using the respective plausibility-tested estimated range whether the environment recording sensors respectively have a sufficient estimated range for the automated, in particular highly automated or autonomous driving operation. Too high an estimation of the range, which is not actually present, and due to which objects might erroneously fail to be recognized, is thus avoided. A danger to occupants of the vehicle and to other traffic participants is thus avoided.

The estimated range of the respective environment recording sensor is, for example, assessed as being implausible if the environment recording sensor does not record an object over a predetermined period of time which, according to its estimated range, it should have recorded. The information that this object is located within the estimated range of the environment recording sensor is, for example, formed using the other environment recording sensors.

If an estimated range of an environment recording sensor is assessed as being implausible, the estimated range of this environment recording sensor is expediently corrected to a smaller value. This can for example lead the estimated range to be set to the value zero. It is thus ensured that the estimated range of the environment recording sensor corresponds at least to its actual range, or, for safety reasons, is smaller than its actual range. As a result, this prevents a limited range of the environment recording sensor from leading to no or an insufficient reaction to objects that are present because they are not detected or are detected too late.

The term range should in particular be understood to mean a recording range of the respective environment recording sensor. The estimated range is thus the estimated recording range of the respective environment recording sensor.

Exemplary embodiments of the invention are explained in more detail in the following with reference to drawings.

BRIEF DESCRIPTION OF THE DRAWING FIGURES

Here.

Parts corresponding to one another are provided with the same reference numerals in all figures.

DETAILED DESCRIPTION

Figure 1:
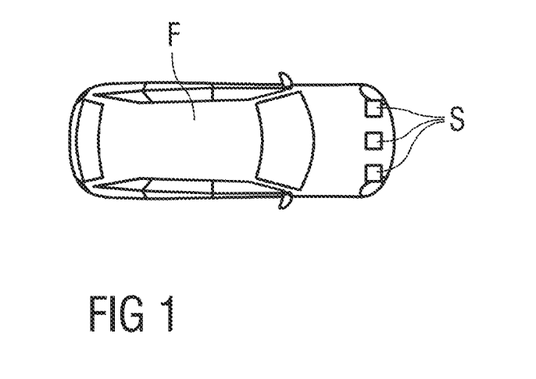
FIG. 1 schematically shows a vehicle having environment recording sensors.

In the following, a method is described for operating a vehicle F—shown schematically in an exemplary form in FIG. 1—in an automated, in particular highly automated or autonomous driving operation. In this method, as described in even more detail in the following, a respective range R of environment recording sensors S of the vehicle F is estimated. This estimated range R is advantageously plausibility-tested. FIGS. 2 to 8 show different examples of this plausibility test.

The automated, in particular highly automated or autonomous driving operation is designed for speeds below a predetermined maximum speed. The speed of the vehicle F must be adapted to the range of the environment recording sensors S, such that the vehicle F can react appropriately, in particular with a predetermined delay, to hindrances that suddenly arise in the recording region of the environment recording sensors S. Here it is problematic that the ranges of the environment recording sensors S can be reduced due to dirt, functional disturbances, for example overheating, and/or weather conditions, for example fog and/or rain, to such an extent that a safe automated, in particular highly automated or autonomous driving operation can no longer be ensured at the current speed. The solution described in the following shows which measures should be taken in such a case.

In summary, in the method described here for operating the vehicle F in the automated, in particular in the highly automated or autonomous driving operation, it is provided that a respective range R of the environment recording sensors S of the vehicle F is estimated by evaluating sensor signals of the environment recording sensors S. This relates, in particular, exclusively to those environment recording sensors S of the vehicle F that are provided to record an environment of the vehicle F in the direction of travel of the vehicle F, as shown in FIGS. 1 to 8. It is checked whether the environment recording sensors S respectively have a sufficient estimated range R for the automated, in particular highly automated or autonomous driving operation. The respective estimated range R is in particular viewed, i.e., assessed, as being sufficient if the vehicle F can be braked to a standstill within this estimated range R with a predetermined delay, and/or if the respectively estimated range R exceeds a minimum sensor range which is predetermined for the current speed of the vehicle F.

If it is determined that only one of the environment recording sensors S does not have a sufficient estimated range R, or that only a predetermined subset of the environment recording sensors S respectively do not have a sufficient estimated range R, the vehicle F is advantageously still moved in the automated, in particular highly automated or autonomous driving operation, wherein the speed of the vehicle F is for example kept constant, or is reduced to a predetermined limited extent, for example by a predetermined relative value, in particular specified in percent, or by a predetermined absolute value, in particular specified in km/h, and wherein, a request to take over a driving task is output to a vehicle driver of the vehicle F instantly or with a predetermined time delay. It can, for example, be provided that only one relative or absolute value, by which the speed of the vehicle F is reduced, is predetermined, or, for example, several relative values and/or several absolute values can be predetermined, which are used depending on the respectively estimated range R. This means that the relative values and/or absolute values are then assigned to a respective range value or range of range values, and then the relative or absolute value is used which is assigned to the range value or range of range values of the respectively estimated range R.

If it is determined that all of the environment recording sensors S, or more environment recording sensors S than the predetermined subset, or different environment recording sensors S to the predetermined subset respectively do not have a sufficient range R, the vehicle F is still moved in the automated, in particular highly automated or autonomous driving operation, wherein the speed of the vehicle F is reduced to a predetermined more significant extent, i.e., more significantly than the predetermined low reduction specified above, and wherein the request to take over the task of driving the vehicle F is output to the vehicle driver instantly.

In the following, this solution is described again in detail.

The vehicle F is equipped for the automated, in particular highly automated or autonomous driving operation. The vehicle F, for example, comprises three environment recording sensors S of different types, which are provided to record the environment in the direction of travel of the vehicle F, in particular a radar sensor, a lidar sensor, and a camera sensor. The method also works, and in the same manner, with more than three environment recording sensors S.

The automated, in particular highly automated or autonomous driving operation is only possible below a predetermined maximum speed, for example 60 km/h. In the automated, in particular highly automated or autonomous driving operation, the vehicle F is accelerated at most to the predetermined maximum speed. If the vehicle driver would like to drive faster, they must take over the driving task, and thus end the automated, in particular highly automated or autonomous driving operation.

For example, the range estimation is carried out cyclically, in particular temporally cyclically. For each of the environment recording sensors S, its range R is, for example, estimated in each temporal cycle. In a lidar sensor or radar sensor, this estimation is, for example, based on an evaluation of intensities of ground reflections and/or object reflections and a spacing from the place of reflection. In a camera sensor, the estimation is, for example, based on a determination of a spacing from the furthest object which can still be recorded. The sensor range can also be determined, in particular estimated, by tracking the spacing from an object which is moving away from the vehicle F. The range R, in particular the estimated range R, of the respective environment recording sensor S then corresponds to the spacing at which the tracked object is no longer recognized by the environment recording sensor.

For example, a minimum sensor range is predetermined, which is required to permit the automated, in particular highly automated or autonomous driving operation at the current speed of the vehicle F. The estimated range R of the respective environment recording sensor S is thus sufficient for the automated, in particular highly automated or autonomous driving operation if it is greater than the minimum sensor range.

In the automated, in particular highly automated or autonomous driving operation, the smallest estimated range R is, for example, selected cyclically from the set of the ranges R estimated for the three environment recording sensors S in the example described here, and it is checked whether this smallest estimated range R is greater than the minimum sensor range. It is thus determined whether all of the environment recording sensors S have a sufficient estimated range R for the automated, in particular highly automated or autonomous driving operation. If this is the case, the automated, in particular highly automated or autonomous driving operation is carried out as normal.

If only one of the estimated ranges R of the set of estimated ranges R is smaller than the minimum sensor range, and thus if there is a situation in which only one of the environment recording sensors S has an insufficient estimated range R for the automated, in particular highly automated or autonomous driving operation, the vehicle driver is advantageously requested to take over the driving task, and the automated, in particular highly automated or autonomous driving operation advantageously initially continues unchanged or with a slightly reduced speed. This takeover request is advantageously only output after a predetermined waiting time, i.e., with a predetermined time delay. In particular, it is only output if the situation that only one of the environment recording sensors S does not have a sufficient estimated range R persists when the waiting time has elapsed.

If, during the waiting time, the situation arises that all of the environment recording sensors S once again have a sufficient estimated range R, then there is no longer a need to transfer the driving task to the vehicle driver, and advantageously, no takeover request is then output, and the automated, in particular highly automated or autonomous driving operation is continued unchanged.

The automated, in particular highly automated or autonomous driving operation is advantageously ended if, after the takeover request is output, the vehicle driver does not take over the driving task within a predetermined or pre-determinable takeover time interval following the output of the takeover request.

If more than one of the ranges R from the set of estimated ranges R is smaller than the minimum sensor range, and thus if there is a situation in which more than one of the environment recording sensors S has an insufficient estimated range R for the automated, in particular highly automated or autonomous driving operation, the vehicle driver is advantageously requested to take over the driving task, and the automated, in particular highly automated or autonomous driving operation is advantageously continued with a braking intervention by which the vehicle F is significantly decelerated. The automated, in particular highly automated or autonomous driving operation is advantageously ended if the vehicle driver does not take over the driving task within the predetermined or pre-determinable takeover time interval following the request.

Preferably, the method steps above, in particular the method steps after the respective range R of the environment recording sensors S of the vehicle F has been estimated, are carried out only after the plausibility test of these estimated ranges R. The estimated range R of the respective environment recording sensor S is, for example, assessed as being implausible if the environment recording sensor S does not record a particular object over a predetermined period of time which, according to its estimated range R, it should have recorded. The information that this particular object is located within its estimated range R is, for example, formed using the other environment recording sensors S. If the estimated range R of an environment recording sensor S is assessed as being implausible, it is advantageously corrected to a smaller value. In an extreme case, the estimated range R can also be set to the value zero.

In detail, the plausibility test of the estimated range R of the respective environment recording sensor S is for example carried out as follows:

Via sensor data fusion, particular objects, also described as fusion objects, for example other moving vehicles F1, F2, F3, are recognized in a relevant region of the environment, for example in a lane of the vehicle F and in adjacent lanes.

The range R estimated by the environment recording sensor S is plausibility-tested, i.e., confirmed, using the fusion objects, in particular by a system, which is in particular a component of the vehicle F, which carries out the method and which is correspondingly designed and equipped for this purpose, and which is in particular designed and equipped to carry out the automated, in particular highly automated or autonomous driving operation of the vehicle F.

The estimated range R of the environment recording sensor S is classified, i.e., confirmed, as being plausible if the fusion objects are recognized and signaled with sufficient quality. The estimated range R of the environment recording sensor S is classified as being implausible if the fusion objects or one or more of the fusion objects are not recognized and signaled with sufficient quality.

Such fusion objects, which are not recognized and signaled with sufficient quality, are considered contra-indicators. If a contra-indicator is recognized, this can give an indication of an implausible estimated range R.

A contra-indicator candidate must advantageously fulfil a series of criteria before it is confirmed as a contra-indicator. It must for example be located within the estimated range R of the environment recording sensor S. It must for example be located within a defined detection region, i.e., recording region of the environment recording sensor S. For example, it must be able to be recorded by the environment recording sensor S. The contra-indicator candidate, i.e., the object, in particular fusion object, must for example have predetermined qualities, for example a predetermined reflectivity, to be able to be recorded by the environment recording sensor S. For example, the contra-indicator candidate may not be covered in relation to the environment recording sensor S. The object is for example only a contra-indicator candidate or already a contra-indicator if it is not recognized often enough by the environment recording sensor S and/or if, for example, a hit quota and/or a true positive rate of the environment recording sensor S differs with regard to the object, in particular fusion object, from a predetermined minimum hit quota and/or true positive rate, in particular falls short of the predetermined minimum hit quota and/or the predetermined true positive rate. For example, the object is only a contra-indicator candidate or already a contra-indicator if it is recorded by the environment recording sensor S, but a recording grade and/or recording quality is not sufficient. The object is for example only a contra-indicator candidate or already a contra-indicator if the environment recording sensor S may not under-prioritize or overlook the object in the present situation according to the sensor specification, for example if the signal interface is full, for example if the object may not be classified as irrelevant by the environment recording sensor S according to the specification. The term full signal interface should in particular be understood to mean that the respective environment recording sensor S can only transmit a limited number of objects, in particular via a bus communication, for example to an evaluation unit. If a very large number of objects are detected, i.e., more than the maximum which can be transmitted, the respective environment recording sensor S must prioritize which objects it transmits. This occurs in particular using predetermined prioritization rules, which have been specified in the environment recording sensors S.

In FIGS. 2 to 8, the fusion objects are represented as other vehicles F1, F2, F3, which are located together with the vehicle F on a road, here respectively having several lanes, and thus here respectively in the lane of the vehicle F or in an adjacent lane. They are respectively located in front of the vehicle F. It is schematically depicted with a check which of the other vehicles F1, F2, F3 has been recorded by the environment recording sensor S of which the estimated range R should be plausibility tested. It is schematically depicted with a cross which of the other vehicles F1, F2, F3 has not been recorded by the environment recording sensor S. Another vehicle F1, F2, F3, which has not been recorded by the environment recording sensor S, is a contra-indicator for the plausibility of the estimated range R. The estimated range R of the environment recording sensor S is indicated by a dashed line.

Figure 2:
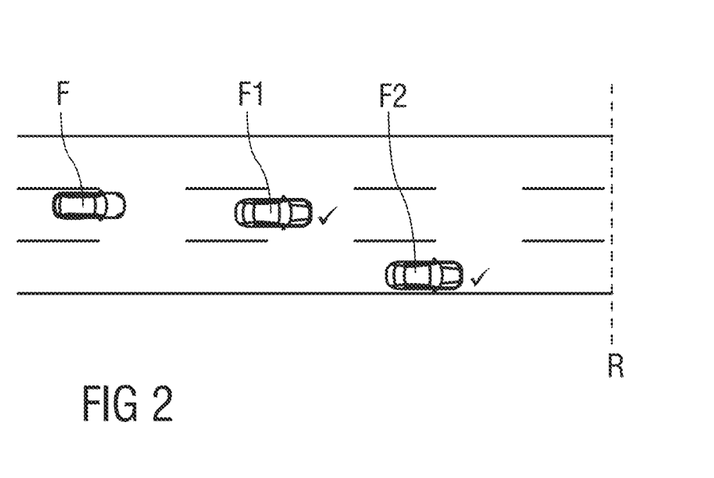
FIG. 2 schematically shows an exemplary embodiment of a plausibility test of a range of an environment recording sensor of the vehicle estimated during a method for operating a vehicle in an automated driving operation, FIG. 3 schematically shows a further exemplary embodiment of the plausibility test, FIG. 4 schematically shows a further exemplary embodiment of the plausibility test, FIG. 5 schematically shows a further exemplary embodiment of the plausibility test, FIG. 6 schematically shows a further exemplary embodiment of the plausibility test, FIG. 7 schematically shows a further exemplary embodiment of the plausibility test, and FIG. 8 schematically shows a further exemplary embodiment of the plausibility test.

In FIG. 2, the environment recording sensor S has recorded both of the other vehicles F1, F2 that are located within the estimated range R. It is thus determined that the other vehicles F1, F2 are located within the estimated range R, and also the actual range of the environment recording sensor S. There is no contra-indicator for the estimated range R. The estimated range R of the environment recording sensor S is thus assessed as being plausible.

Figure 3:
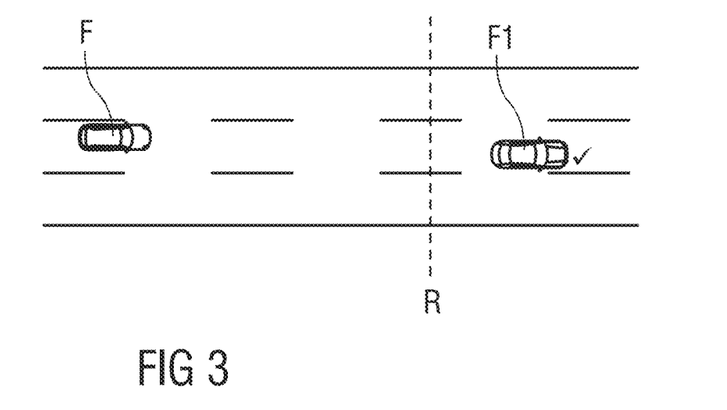

In FIG. 3, the environment recording sensor S has recorded the other vehicle F1, although it is located outside of the estimated range R of the environment recording sensor S. There is no contra-indicator for the estimated range R. The estimated range R of the environment recording sensor S is thus assessed as being plausible.

Figure 4:
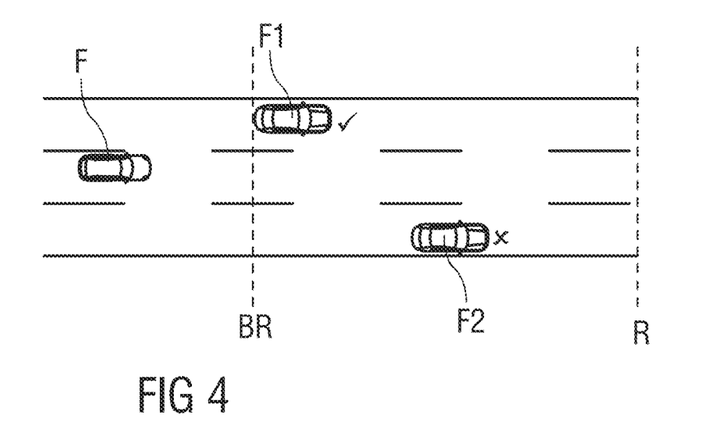

In FIG. 4, the environment recording sensor S has not recorded the second other vehicle F2 which is further away, although it should have recorded the second other vehicle because it is located within the estimated range R of the environment recording sensor S. It is thus confirmed that the second other vehicle F2 is located outside of the actual range of the environment recording sensor S. The second other vehicle F2 is thus a contra-indicator for the estimated range R. The first other vehicle F1, which is less far away, has been recorded by the environment recording sensor S. The sensor range is thus confirmed as certain up to this first other vehicle F1. The estimated range R of the environment recording sensor S is assessed as being implausible due to the contra-indicator, and is corrected to the sensor range BR confirmed as certain up to the first other vehicle F1, i.e., this sensor range BR confirmed as certain is the new estimated range R.

Figure 5:
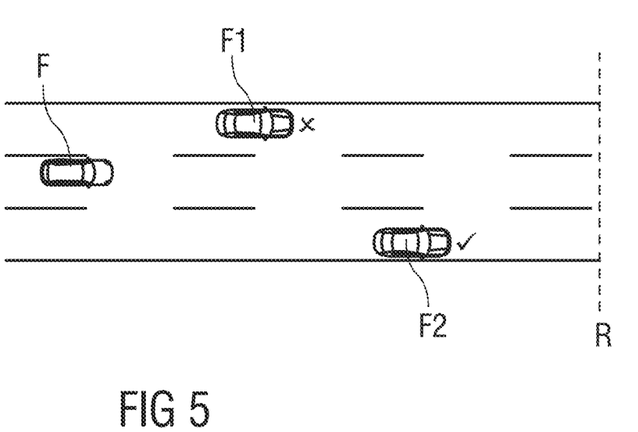

In FIG. 5, the environment recording sensor S has not recorded the first other vehicle F1, although it should have recorded said first other vehicle because it is located within the estimated range R of the environment recording sensor S. It is thus confirmed that the first other vehicle F1 is located outside of the actual range of the environment recording sensor S. Although the environment recording sensor S has recorded the second other vehicle F2 which is further away, which is also located within the estimated range R, this recording of the second other vehicle F2 which is further away is confirmed as uncertain because the first other vehicle F1 which is not as far away has not been recorded. The first other vehicle F1 is a contra-indicator for the estimated range R. The estimated range R of the environment recording sensor S is thus assessed as being implausible. It is set to zero, because there is no sensor range BR of the environment recording sensor S confirmed as certain. The new estimated range R of the environment recording sensor S is thus zero.

Figure 6:
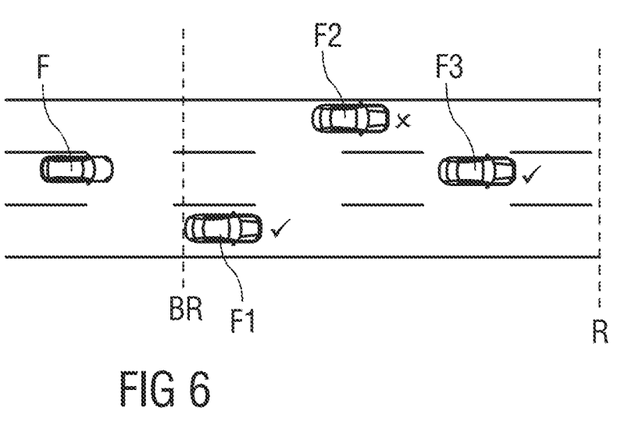

In FIG. 6, the environment recording sensor S has not recorded the second other vehicle F2, although it should have recorded the second other vehicle because it is located within the estimated range R of the environment recording sensor S. It is thus confirmed that the second other vehicle F2 is located outside of the actual range of the environment recording sensor S. Although the environment recording sensor S has recorded the third other vehicle F3 which is further away and which is also located within the estimated range R, this recording of the third other vehicle F3 which is further away is confirmed as uncertain because the second other vehicle F2 which is not as far away has not been recorded. The second other vehicle F2 is a contra-indicator for the estimated range R. The first other vehicle F1 positioned closest to the environment recording sensor S of the vehicle F has been recorded by the environment recording sensor S. The range of the environment recording sensor S is thus confirmed as certain up to this first other vehicle F1. The estimated range R of the environment recording sensor S is assessed as being implausible due to the contra-indicator, and is corrected to the sensor range BR confirmed as certain up to the first other vehicle F1. The latter is thus the new estimated range R.

Figure 7:
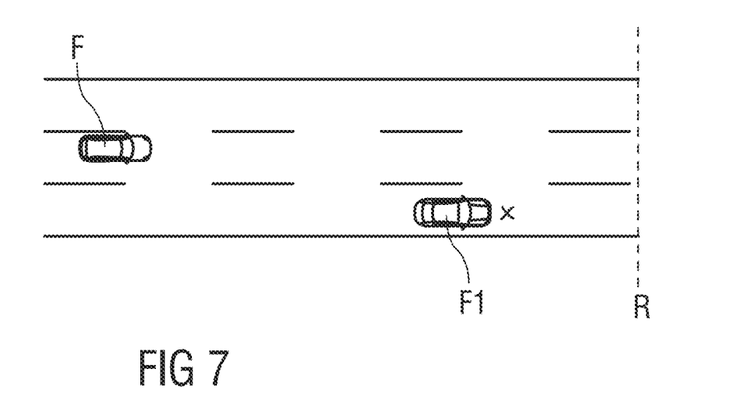

In FIG. 7, the environment recording sensor S has not recorded the other vehicle F1, although it should have recorded the first other vehicle because it is located within the estimated range R of the environment recording sensor S. It is thus confirmed that the other vehicle F1 is located outside of the actual range of the environment recording sensor S. The other vehicle F1 is thus a contra-indicator for the estimated range R. The estimated range R of the environment recording sensor S is thus assessed as being implausible. It is set to the value zero, because there is no sensor range BR of the environment recording sensor S confirmed as certain. The new estimated range R of the environment recording sensor S is thus zero.

Figure 8:
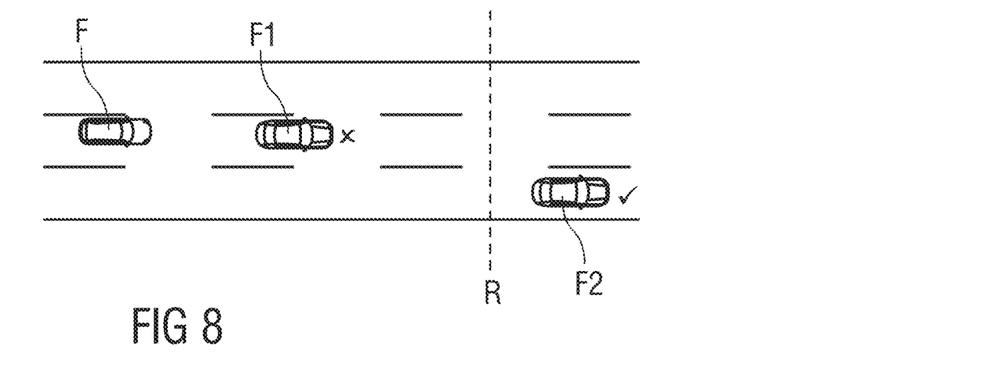

In FIG. 8, the environment recording sensor S has not recorded the first other vehicle F1, although it should have recorded the first other vehicle because it is located within the estimated range R of the environment recording sensor S. It is thus confirmed that the first other vehicle F1 is located outside of the actual range of the environment recording sensor S. Although the environment recording sensor S has recorded the second other vehicle F2 which is further away, although it is located outside of the estimated range R of the environment recording sensor S, this recording of the second other vehicle F2 which is further away is confirmed, however, as uncertain because the first other vehicle F1 which is not as far away has not been recorded. The first other vehicle F1 is a contra-indicator for the estimated range R of the environment recording sensor S. The estimated range R of the environment recording sensor S is thus assessed as being implausible. It is set to the value zero, because there is no sensor range BR of the environment recording sensor S confirmed as certain. The new estimated range R of the environment recording sensor S is thus zero.

For example, a system range is determined using the estimated ranges R of the environment recording sensors S. For example, the system range corresponds to the minimum of the estimated ranges R of all of the environment recording sensors S of the vehicle F.

For example, using an estimated range R of an, in particular, predetermined subset of the environment recording sensors S of the vehicle F, a partial system range is determined. For example, the partial system range corresponds to the minimum of the estimated ranges R of main sensors. The subset of the environment recording sensors S thus comprises only these main sensors, for example only the radar sensor and the camera sensor. As an alternative, the subset, for example, comprises only the best environment recording sensors S in a respective present situation, i.e., only the environment recording sensors S that have the best, i.e., the largest, estimated range R in this situation. For example, the partial system range then corresponds to the minimum of the estimated ranges R of these best environment recording sensors S in the respective present situation.

For example, the vehicle F, as already mentioned above, has three environment recording sensors S.

In a possible exemplary embodiment, the first environment recording sensor S has an estimated range R of 70 m, the second environment recording sensor S has an estimated range of 150 m, and the third environment recording sensor S has an estimated range R of 200 m. The minimum of all three estimated ranges R as a system range would thus be 70 m. The minimum of the estimated ranges R of the two best environment recording sensors S in the present situation as a partial system range would then be 150 m.

In a possible exemplary embodiment, the first environment recording sensor S has an estimated range R of 0 m, the second environment recording sensor S has an estimated range of 0 m, and the third environment recording sensor S has an estimated range of 200 m. The minimum of all three estimated ranges R as a system range would thus be 0 m. The minimum of the estimated ranges R of the two best environment recording sensors S in the present situation as a partial system range would then also be 0 m.

In a possible exemplary embodiment, the first environment recording sensor S has an estimated range R of 0 m, the second environment recording sensor S has an estimated range of 150 m, and the third environment recording sensor S has an estimated range of 200 m. The minimum of all three estimated ranges R as a system range would thus be 0 m. The minimum of the estimated ranges R of the two best environment recording sensors S in the present situation as a partial system range would then be 150 m.

For example, it is then provided that if a system range is not sufficient for the automated, in particular highly automated or autonomous driving operation, the request to take over the driving task is output to the vehicle driver. If the partial system range is sufficient for the automated, in particular highly automated or autonomous driving operation, the speed of the vehicle F is for example additionally kept constant or slightly reduced until the vehicle driver has taken over the driving task. If the partial system range is not sufficient for the automated, in particular highly automated or autonomous driving operation, the vehicle F is for example decelerated more significantly, or a different, in particular stronger system reaction is triggered.

If the partial system range for the automated, in particular highly automated or autonomous driving operation is sufficient, it can, for example, be provided that initially, no request to take over the driving task is output to the vehicle driver, but rather, the journey of the vehicle F is first continued for a predetermined maximum period of time using the partial system range. In this period of time, the system range can improve again, and there is no more limit with regard to the system range and the speed resulting from it for the automated, in particular highly automated or autonomous driving operation. If the system range has not improved again, and thus in particular a problem causing this continues to exist, then another system reaction, in particular the output of the request to take over the driving task to the vehicle driver can be implemented. This request to take over the driving task is thus output to the vehicle driver with a time delay, wherein this output is not required if the system range has improved again sufficiently within this time delay.

To simplify and in summary, it is, for example, provided that if the estimated range R, in particular of one or more main sensors, is no longer sufficient to carry out the automated, in particular highly automated or autonomous driving operation, the estimated range is bridged for a predetermined period of time with the other environment recording sensors S if these other environment recording sensors S have a sufficient estimated range R, and the situation can thus be managed. A reaction to the insufficient estimated range R then takes place only after this predetermined period of time has elapsed, in particular by outputting the request to take over the driving task to the vehicle driver.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for operating a vehicle in an automated driving operation, the method comprising:
   estimating a respective range of environment recording sensors of the vehicle by evaluating sensor signals of the environment recording sensors;
   determining whether the environment recording sensors respectively have a sufficient estimated range for the automated driving operation,
   wherein, if it is determined that only one of the environment recording sensors does not have a sufficient estimated range or that only a predetermined subset of the environment recording sensors respectively do not have a sufficient estimated range, the vehicle continues to be moved in the automated driving operation, wherein a speed of the vehicle is kept constant or reduced to a predetermined limited extent, and wherein a request to take over a driving task is output to a vehicle driver instantly or after a predetermined time delay,
   wherein, if it is determined that all of the environment recording sensors or more or different environment recording sensors than the predetermined subset respectively do not have a sufficient estimated range, the vehicle continues to be moved in the automated driving operation, wherein the speed of the vehicle is reduced to a predetermined more significant extent, and wherein the request to take over the task of driving the vehicle is instantly output to the vehicle driver, and
   wherein the automated driving operation is continued at the original speed, and no request to take over the driving task is output to the vehicle driver if, within the predetermined time delay until the request to take over the driving task is output to the vehicle driver, it is determined that the environment recording sensors respectively have a sufficient estimated range for the automated driving operation.

2. The method of claim 1, wherein the respective estimated range is determined as being sufficient if the vehicle can be braked to a standstill within this estimated range with a predetermined delay or if the respective estimated range exceeds a minimum sensor range that is predetermined for a current speed of the vehicle.

3. The method of claim 1, wherein the automated driving operation is ended if the vehicle driver does not take over the driving task within a predetermined or predeterminable takeover interval of time following the output of the request.

4. The method of claim 1, wherein the respective range is estimated of those environment recording sensors of the vehicle provided to record an environment of the vehicle in a direction of travel of the vehicle.

5. The method of claim 1, wherein the respective range of environment recording sensors of different types is estimated.

6. The method of claim 1, wherein the respective range of at least one radar sensor, of at least one lidar sensor, and of at least one camera sensor is estimated.

7. The method of claim 1, wherein a plausibility test of the respective estimated range is first performed, and using the respective plausibility tested estimated range, it is checked whether the environment recording sensors respectively have a sufficient estimated range for the automated driving operation.

8. The method of claim 7, wherein the estimated range of the respective environment recording sensor is assessed as being implausible if the environment recording sensor does not record an object over a predetermined period of time which, according to its estimated range, it should have recorded.

9. The method of claim 8, wherein if an estimated range of an environment recording sensor is assessed as being implausible, the estimated range of this environment recording sensor is corrected to a smaller value.

* * * * *